United States Patent [19]

Szudarek et al.

[11] Patent Number: 5,324,151
[45] Date of Patent: Jun. 28, 1994

[54] ANTI-ROTATIONAL FASTENER

[75] Inventors: Robert Szudarek, Warren; Dhirendra C. Roy, Canton, both of Mich.

[73] Assignee: United Technologies Automotive, Inc., Dearborn, Mich.

[21] Appl. No.: 38,788

[22] Filed: Mar. 29, 1993

[51] Int. Cl.5 .................. F16L 3/08; F16L 3/22; F16B 19/00
[52] U.S. Cl. ...................... 411/510; 411/913; 248/68.1; 248/74.1
[58] Field of Search ........... 411/338, 339, 508–510, 411/913; 24/297; 248/68.1, 74.1, 74.4

[56] References Cited

U.S. PATENT DOCUMENTS

| | | | |
|---|---|---|---|
| 2,931,851 | 4/1960 | Sims . | |
| 4,011,770 | 3/1977 | Webb | 411/508 X |
| 4,381,633 | 5/1983 | MacLeod | 411/510 X |
| 4,840,334 | 6/1989 | Kikuchi | 411/508 X |
| 4,865,280 | 9/1989 | Wollar . | |
| 4,865,281 | 9/1989 | Wollar . | |
| 4,902,182 | 2/1990 | Lewis | 411/510 |
| 4,993,903 | 2/1991 | Kraus | 24/297 X |
| 5,039,040 | 8/1991 | Idjakiren | 24/297 X |

FOREIGN PATENT DOCUMENTS 959039  5/1964  United Kingdom ............... 411/510

*Primary Examiner*—Neill R. Wilson
*Attorney, Agent, or Firm*—Harness, Dickey & Pierce

[57] ABSTRACT

The present invention anti-rotational fastener for an automotive vehicle comprises a cap portion suitable for attachment to an electrical apparatus and a barbed shaft. The shaft has a pair of broad sides and a pair of thin sides, all of which extend perpendicularly downward from the cap portion for attachment to an automotive vehicle body panel. This difference in shaft side dimensions corresponds to an elongated slot cut within the vehicle body panel, thereby preventing rotation of the fastener and, in turn, the electrical apparatus. Furthermore, an upper portion of the shaft broad sides has a pair of wings oppositely extending outward therefrom in order to mechanically stabilize the fastener against rotational movements in vertical planes which would otherwise tend to loosen the fastener. In an alternative embodiment, the anti-rotational fastener of the present invention can be used to retain and prevent rotation of a portion of a wire harness.

8 Claims, 2 Drawing Sheets

ANTI-ROTATIONAL FASTENER

BACKGROUND OF THE INVENTION

This invention relates generally to anti-rotational fasteners for electrical apparatuses primarily used in automotive vehicles and specifically to anti-rotational fasteners having a single shaft with barbs thereupon for retaining electrical connectors or wire harnesses to an automotive vehicle body panel.

The worldwide automotive market has increasingly forced automobile manufacturers and suppliers to develop more cost effective designs and methods of assembly in order to be competitive. However, the number of electrically operated devices in each vehicle has continued to increase, which requires more electrical connectors and wire harnesses. There is a corresponding increase in assembly labor time relating to wiring. Furthermore, more efficient packaging is required due to the greater wiring content while maintaining mechanical integrity and electrical continuity.

Traditionally, electrical connectors are attached to a vehicle body panel by a polymeric fastener having a cap portion with a pair of fins and a cavity which engagably locks an electrical connector thereupon and a barbed Christmas tree-type member extending downward therefrom; the fastener also contains an anti-rotational barbed locator clip protruding downwardly parallel to the Christmas tree projection. Such a device is shown as prior art in FIG. 1. This .type of anti-rotational fastener is designed to maintain a constant position of the electrical connector thereby allowing for one-handed attachment of one electrical connector half to another. However, it can be difficult for an assembler to install such a fastener into the vehicle during a blind operation where the body of the electrical connector obscures the assembler's ability to view the body panel holes since both the Christmas tree and the locator clip must be simultaneously aligned and inserted into their respective holes. Furthermore, insertion effort can be quite high due to part tolerance variations between the Christmas tree and the locator clip and due to wide variations of the modulus of elasticity caused by the hydroscopic nature of the fastener materials. Finally, while such traditional anti-rotational fasteners are conceptually adequate, in practice they tend to be somewhat difficult to manufacture because of the very complicated actions required to tool and mold such a delicate product.

Another snap-in fastener commonly used to retain wire harnesses to vehicle body panels is disclosed in U.S. Pat. No. 3,210,030 entitled "Wiring Harness Installation," issued to Ramsey, et al. on Oct. 5, 1965. This fastener, however, does not prevent rotational movement.

SUMMARY OF THE INVENTION

In accordance with the present invention, the preferred embodiment of an anti-rotational fastener for an automotive vehicle comprises a cap portion suitable for cooperative attachment to an electrical apparatus and a single barbed shaft which has a pair of broad sides and a pair of thin sides; the shaft extends perpendicularly downward from the cap portion for attachment to an automotive vehicle body panel. This difference in shaft side dimensions corresponds to an elongated slot cut within the vehicle body panel, thereby preventing rotation of the fastener and, in turn, the electrical apparatus. Furthermore, a pair of wings oppositely extend outward from an upper portion of the shaft broad sides in order to stabilize the fastener against rotational movements in vertical planes which would otherwise tend to loosen it from the body panel. Also, the barbed shaft has a hollow core which allows for easy deflection of the shaft during installation into the body panel. Thus, the fastener of the present invention is easy to install since the assembler only needs to insert a single shaft into a single keyholed body panel slot.

When used with an electrical connector, the cap portion has a pair of fins which correspond, through a preloaded interference-fit, with a pair of inwardly facing channels contained within the electrical connector. The cap portion also has an inner cavity and a flexible member which partially covers the cavity, both of which provide a locking interface with a corresponding tab on the electrical connector.

In an alternative embodiment, the anti-rotational fastener of the present invention can be used to retain and prevent rotation of a portion of a wire harness thereby allowing for more efficient and predictable packaging. In this embodiment, a trough-shaped formation outwardly extends from the cap portion such that the wire harness can be taped thereto. The shaft and barbed design are similar to that of the preferred embodiment.

Additional advantages and features of the present invention will become apparent from the following description and appended claims, taken in conjunction with the accompanying drawings.

DETAILED DESCRIPTION OF THE PREFERRED EMBODIMENT

Figure 1:
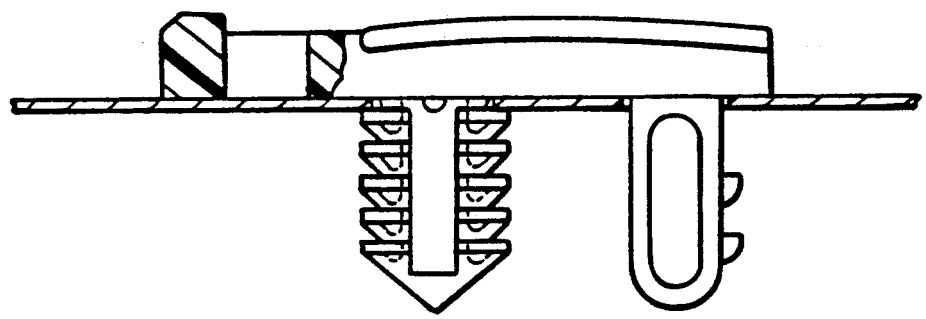
FIG. 1 is a side elevation view, partially in section, of a prior art anti-rotational fastener in a panel with a portion broken away therefrom.
Figure 2:
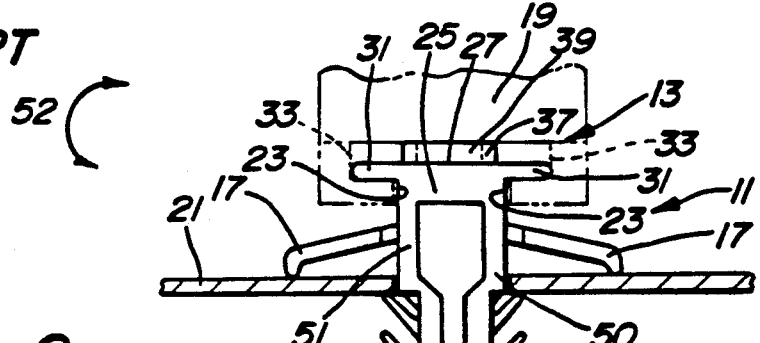
FIG. 2 is an end elevation view, partially in section, showing a preferred embodiment of an anti-rotational fastener of the present invention in a panel.
Figure 3:
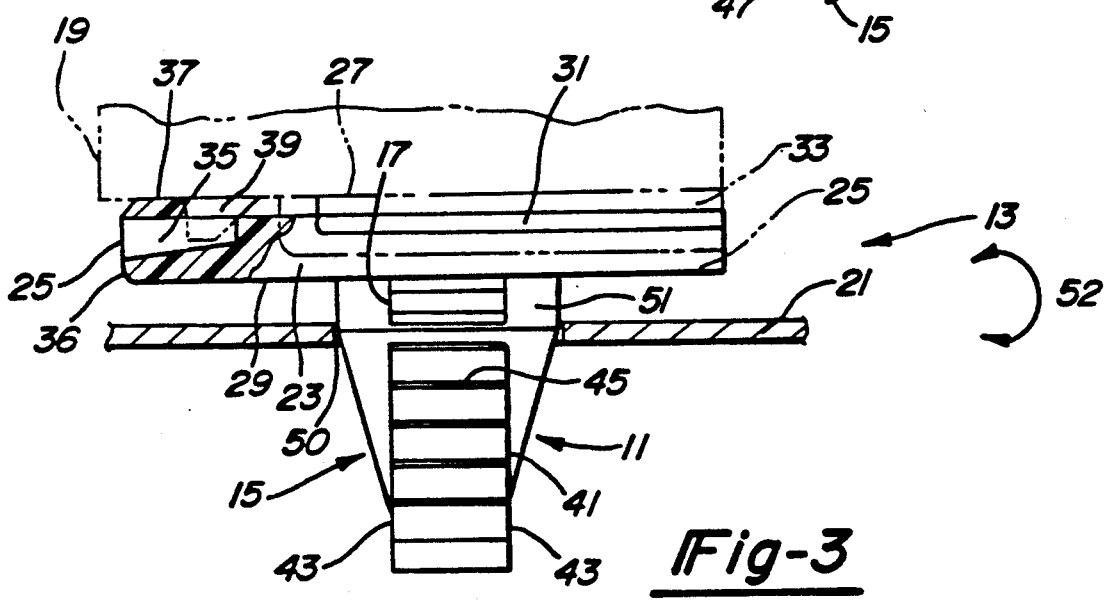
FIG. 3 is a side elevation view, partially in section, of the present invention anti-rotational fastener of FIG. 2 in a panel with a section broken away therefrom.

The preferred embodiment of the present invention anti-rotational fastener 11 is shown in FIGS. 2 and 3. Fastener 11 has a cap portion 13, a single shaft 15 and a pair of wings 17. Fastener 11 serves to attach an electrical connector 19 onto a sheet metal panel 21 in a fixed position.

In the preferred embodiment, cap portion 13 is a hexahedron-sided member with a long pair of side walls 23 having a greater lateral dimension than the adjacent narrow pair of side walls 25. Cap portion 13 is also bordered by a top surface 27 and a bottom surface 29. Each long side wall 23 has a corresponding fin 31 extending outward therefrom. Fins 31 are proximate to the top surface 27 and may have a flat or slightly crown-shaped profile. Electrical connector 19 has a pair of inwardly opening channels 33 which correspond to the pair of fins 31. Channels 33 can be slid onto fins 31 for a preloaded interference-fit engagement. Furthermore, cap portion 13 has a cavity 35 juxtapositioned within an end 36 thereof which is partially covered by a raised flexible member 37. Cavity 35 and flexible member 37 are designed for a preloaded lockable engagement with a corresponding tab 39 extending downward from electrical connector 19. Fin 31, cavity 35 and flexible member 37 cooperatively act to secure the electrical connector to cap portion 13 of fastener 11.

Shaft 15 of fastener 11 has a pair of broad sides 41, which correspond with long side walls 23 of cap portion 13; shaft 15 also has a pair of thin sides 43 which correspond with narrow side walls 25 of cap portion 13. Each broad side 41 contains a plurality of barbs 45 extending outward therefrom and being angled upward toward cap portion 13. Accordingly, tip 47 of shaft 15 has a point formed thereupon. The core 49 of shaft 15 is hollow, thereby allowing each broad side 41 of shaft 15 to be easily deflected toward one another and also allowing for easier manufacturability. Furthermore, thin sides 43 are outwardly angled toward bottom surface 29 of cap portion 13, this can best be seen in FIG. 3. Shaft 15 is designed to fit into a single elongated slot 50 cut within sheet metal panel 21.

As is illustrated in FIGS. 2 and 3, a pair of wings 17 extend outward and slightly downward from an upper portion 51 of shaft 15. Wings 17 act to mechanically stabilize fastener 11 against rotational movements in the vertical planes noted by arrows 52. Wings 17 also provide a slightly opposing force against installed barbs 45. Fastener 11 is injection molded from nylon 6/6.

Figure 4:
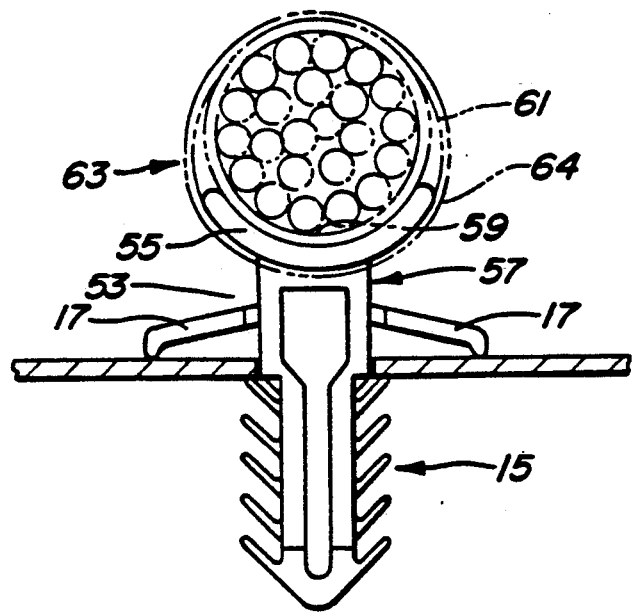
FIG. 4 is an end elevation view of a first alternate embodiment of the present invention anti-rotational fastener for a wire harness.

Referring to FIG. 4, a first alternate embodiment of the present invention anti-rotational fastener 53 is shown. Shaft 15 and wings 17 are of similar construction to the preferred embodiment, however, a trough-shaped formation 55 is integral with cap portion 57 and outwardly opens therefrom. The inner radius 59 of the trough-shaped formation 55 corresponds with an outside diameter 61 of a wire harness 63. Wire harness 63 is attached to trough-shaped formation 61 by adhesive coated tape 64.

Figure 5:
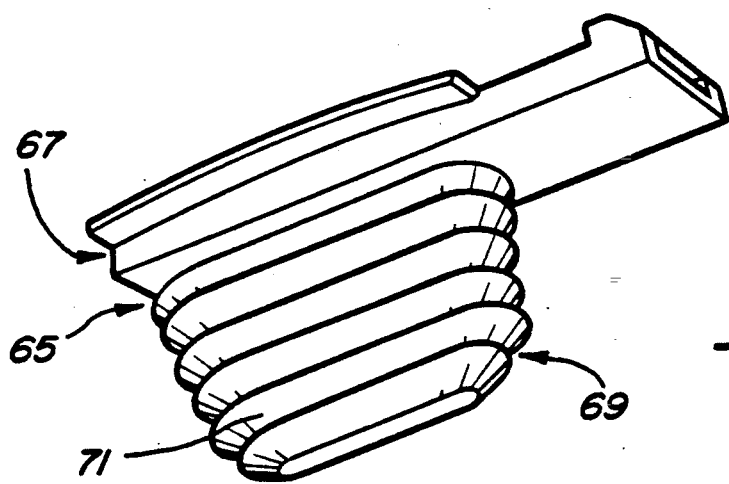
FIG. 5 is a perspective view of a second alternate embodiment of the present invention anti-rotational fastener for an electrical connector.

In a second alternate embodiment, as is depicted in FIG. 5, an anti-rotational fastener 65 contains a cap portion 67 similar to that shown in the preferred embodiment. However, shaft 69 contains a plurality of ovular conical shaped barbs 71 upwardly extending therefrom.

It will be appreciated that the anti-rotational fastener of the present invention represents a significant labor savings and quality improvement. By having only one shaft rather than the two used in the prior art, the vehicle body panel hole design is simplified, the fastener is easier to install, the fastener is more simply tooled, and the electrical connector or wire harness is predictably aligned. All of these factors contribute to a lower cost part and assembly process.

While a number of specific embodiments of this fastener have been disclosed, it will be appreciated that various modifications can be made without departing from the present invention. For example, the cap portion of the anti-rotational fastener may have a different configuration for attachment to the electrical connector. Also, the fastener of the present invention can be used to retain a light bulb socket or other electrical apparatus. While various materials have been disclosed in an exemplary fashion, various other materials may of course be employed. It is intended by the following claims to cover these and any other departures from these disclosed embodiments which fall within the true spirit of this invention.

The invention claimed is:

1. A fastener for an electrical apparatus used in automotive vehicles comprising:
   a cap portion attached to said electrical apparatus, said cap portion having a bottom surface;
   a shaft being integral with said bottom surface of said cap portion and extending perpendicular therebelow, said shaft having a pair of broad sides and a pair of thin sides, each of said pair of broad sides having a plurality of upward angled barbs outwardly extending therefrom, said plurality of barbs having an ovular conical shape angled upward toward said cap portion;
   whereby said electrical apparatus and said fastener are affixed to said automotive vehicle by inserting said plurality of barbs into an elongated opening cut within a panel of said automotive vehicle, said fastener thereby resisting rotational movement in a plane perpendicular to said shaft.

2. A fastener for an electrical apparatus used in automotive vehicles comprising:
   a cap portion having a means thereupon for attachment to said electrical apparatus, said cap portion having a bottom surface;
   said electrical apparatus attachment means further comprising a pair of fins adjacent to said pairs of long side walls of said cap portion and oppositely extending outward therefrom, said pair of fins providing a preloaded interference-fit interface within a corresponding inwardly opening channel integral with a lower surface of said electrical apparatus, said top surface of said cap portion having an inner cavity therewithin being partially covered by a flexible member located at one end thereof, said inner cavity and said flexible member supplying a preloaded locking interface with a corresponding tab protruding from said lower surface of said electrical apparatus;
   a shaft integral with said bottom surface of said cap portion and extending perpendicular therebelow, said shaft having a pair of broad sides and a pair of thin sides, each of said pair of broad sides having a plurality of upward angled barbs outwardly extending therefrom; and
   said cap portion being a hexahedron-sided member comprised of a pair of long side walls aligned with said pair of broad sides of said shaft, and a pair of narrow side walls aligned with said pair of thin sides of said shaft, said pair of long side walls and said pair of narrow side walls being joined by a top surface and said bottom surface;
   whereby said electrical apparatus and said fastener are affixed to said automotive vehicle by inserting said plurality of barbs into an elongated opening within a panel of said automotive vehicle, said fastener thereby resisting rotational movement in a plane perpendicular to said shaft.

3. The fastener of claim 2 wherein said electrical apparatus is an electrical connector used with a wiring harness.

4. The fastener of claim 2 wherein said shaft is hollow in the center thereof.

5. A fastener for an electrical apparatus used in automotive vehicles comprising:
   a cap portion attached to said electrical apparatus, said cap portion having a bottom surface;

a shaft integral with said bottom surface of said cap portion and extending perpendicular therebelow, said shaft having a pair of broad sides and a pair of thin sides, each of said pair of broad sides having a plurality of upward angled barbs outwardly extending therefrom;

an upper portion of said shaft having a pair of wings oppositely extending outward therefrom in a direction substantially normal to each of said pair of broad sides, each of said pair of wings solely extending from a corresponding one of said pair of broad sides of said shaft, whereby said pair of wings aid in stabilizing said fastener against rotational movements applied thereupon in vertical planes; and said electrical apparatus and said fastener being affixed to said automotive vehicle by inserting said plurality of barbs into an elongated opening within a panel of said automotive vehicle, said fastener thereby resisting rotational movement in a plane perpendicular to said shaft.

6. A fastener for an electrical connector used in automotive vehicles comprising:

a cap portion being a hexahedron-sided member comprised of a pair of long side walls and a pair of narrow side walls, said long side walls and said narrow side walls being joined by a top surface and a bottom surface;

a pair of fins adjacent to said long side walls of said cap portion and oppositely extending outward therefrom, said pair of fins providing a preloaded interference-fit interface within a corresponding inwardly opening channel integral with a lower surface of said electrical connector, said top surface of said cap portion having an inner cavity therewithin being partially covered by a flexible member located at one end thereof, said inner cavity and said flexible member supplying a preloaded-locking interface with a corresponding tab protruding from said lower surface of said electrical connector, whereby said electrical connector is attached to said fastener;

a shaft being integral with said bottom surface of said cap portion and extending perpendicular therebelow, said shaft having a pair of broad sides, aligned with said pair of long side walls of said cap portion, and a pair of thin sides, aligned with said pair of narrow side walls of said cap portion, each of said pair of broad sides having a plurality of upward angled barbs outwardly extending therefrom; and an upper portion of said shaft having a pair of wings oppositely extending outward therefrom in a direction substantially normal to each of said pair of broad sides;

whereby said electrical connector and said fastener are affixed to said automotive vehicle by inserting said plurality of barbs into an elongated opening cut within a panel of said automotive vehicle, said fastener thereby resisting rotational movement in a plane perpendicular to said shaft.

7. A fastener for an electrical wiring harness used in automotive vehicles comprising:

a cap portion having an integral partially cylindrical trough-shaped formation outwardly opening therefrom, said trough-shaped formation corresponding in radial size with an outside surface diameter of said wiring harness but surrounding less than half of said outside surface thereof, said cap portion having a bottom surface;

said wiring harness attached to said trough-shaped formation by adhesive coated tape; and a shaft integral with said bottom surface of said cap portion and extending perpendicular therebelow, said shaft having a pair of broad sides and a pair of thin sides, each of said pair of broad sides having a plurality of upward angled barbs outwardly extending therefrom;

whereby said wiring harness and said fastener are affixed to said automotive vehicle by inserting said plurality of barbs into an elongated opening cut within a panel of said automotive vehicle, said fastener thereby resisting rotational movement in a plane perpendicular to said shaft.

8. The fastener of claim 7 further comprising an upper portion of said shaft having a pair of wings oppositely extending outward therefrom in a direction substantially normal to each of said pair of broad sides, each of said pair of wings solely extending from a corresponding one of said pair of broad sides of said shaft, whereby said pair of wings aid in stabilizing said fastener against rotational movements applied thereupon in vertical planes.

* * * * *